ND Patent [19]

Klueh et al.

[11] Patent Number: 4,931,348
[45] Date of Patent: Jun. 5, 1990

[54] REDUCED THICKNESS RESIN SUBSTRATE IN FILM PRINTING RIBBON

[75] Inventors: David R. Klueh, Lexington; Jack W. Morris, Nicholasville; Kent G. Urdahl; Matthew K. Zimmer, both of Lexington, all of Ky.

[73] Assignee: International Business Machines Corporation, Armonk, N.Y.

[21] Appl. No.: 91,222

[22] Filed: Aug. 31, 1987

[51] Int. Cl.⁵ .................. B32B 3/14; B32B 27/08; B41J 31/00
[52] U.S. Cl. .................. 428/207; 428/336; 428/516; 428/914; 400/241.1
[58] Field of Search ............ 428/207, 336, 516; 400/241.1

[56] References Cited

U.S. PATENT DOCUMENTS

| | | | |
|---|---|---|---|
| 3,036,987 | 5/1962 | Ranalli | 260/45.5 |
| 3,176,052 | 3/1965 | Peticolas | 260/897 |
| 3,751,521 | 8/1973 | Iamurri | 260/876 B |
| 3,825,470 | 7/1974 | Ebert et al. | 161/227 |
| 3,941,859 | 3/1976 | Batiuk et al. | 260/876 B |
| 3,952,073 | 4/1976 | Isaka et al. | 260/897 A |
| 3,965,229 | 6/1976 | Driscoll | 264/50 |
| 4,045,515 | 8/1977 | Isaka et al. | 260/897 A |
| 4,565,720 | 1/1986 | Yaeo et al. | 428/516 |
| 4,634,739 | 1/1987 | Vassilatos | 525/240 |
| 4,695,503 | 9/1987 | Hu et al. | 428/207 |
| 4,769,283 | 9/1988 | Sipinen et al. | 428/343 |
| 4,790,676 | 12/1988 | Karatsu et al. | 400/241.1 |
| 4,808,474 | 2/1989 | Sipinen | 428/343 |

FOREIGN PATENT DOCUMENTS 0054598  3/1984  Japan .................................. 428/207

Primary Examiner—P. C. Ives
Attorney, Agent, or Firm—John A. Brady

[57] ABSTRACT

A very thin film ribbon with good printing and lift-off correction characteristics is achieved by using a blend of polyethylene and isotactic polypropylene as the substrate material. Thicker ribbons with the substrate yield dense printing and print well on rough papers.

5 Claims, No Drawings

REDUCED THICKNESS RESIN SUBSTRATE IN FILM PRINTING RIBBON

DESCRIPTION

TECHNICAL FIELD

This invention relates to substrates for film printer ribbons, particularly typewriter and workstation printer ribbons. Film ribbons comprise a substrate supporting an ink layer which is released under impact. The substrate is a layer which provides support and embosses sufficiently with the printing element during impact to release ink in the form of the impact element. The impact element may carry fully formed characters, as in conventional for typewriters, or may comprise a series of dot elements which are selectively activated to form characters. The substrate is typically made as thin as possible to reduce the overall size of the ribbon and thereby reduce the period between ribbon changes and the potential ribbon cost per character printed.

BACKGROUND ART

It is a known objective to reduce the thickness of ribbons so as to conserve space and to achieve more printing from a ribbon of a given size. When the ribbon is housed in a cartridge which is discarded after ribbon use, as is now common, overall ribbon cost is significantly reduced when a thinner ribbon permits increased lengths of ribbon to be contained in such a cartridge. Thus, reducing substrate thickness has been a known and important design objective for printer ribbons.

A prior thin film ribbon has a polyethylene substrate which is stretched during extrusion to a typical thickness of between 0.4 and 0.55 mil (approximately 0.001016 cm to 0.001397 cm). No such ribbon is commercially produced having thickness less than 0.35 mil (approximately 0.000889 cm). Thinner polyethylene sheets are difficult to produce, but, more fundamentally, for thinner polyethylene sheets degradation is observed in both print coverage and eradication by lift-off correction. Production of the very thin polyethylene substrate includes a high degree of molten stretching, which affects the surface conditions or surface energy of the film. This apparently has detrimental effects on the interface between the substrate and the ink layer it carries. Also, the increased orientation decreases the ability of the film to emboss under impact, thereby allowing less of the impact energy to be transferred to the ink in the pattern of the printing element.

This invention employs a polymer blend of polyethylene and isotactic polypropylene as the substrate material, with stretching on a chill roll after extrusion as was standard with the polyethylene, but to a much reduced thickness. The resulting ribbon satisfies commercial standards for both printing and lift-off correction and achieves a significant reduction in costs since it is much thinner. This may be used to achieve an acceptable ribbon having an 0.23 mil substrate, which is thinner than known ribbons. This may also be used for substrates in the conventional range of thicknesses to achieve a ribbon of increased ink transfer, which is particularly suitable for printing on rough papers.

Blends of polyethylene and isotactic polypropylene are broadly known, as illustrated by the following known references, but their use as a thin substrate in the transfer medium art is apparently broadly novel. These references are as follows: U.S. Pat. Nos. 4,634,739 to Vassilatos; 4,045,515 to Isaka et al; 3,965,229 to Driscoll; and 3,952,073 to Isaka et al. It is commonly known that polypropylene has a lower surface energy than polyethylene.

DISCLOSURE OF THE INVENTION

Substrates of nominal 0.23 mil caliper (approximately 0.000584 cm) having desired printer ribbon properties are produced by blending polyethylene resin with isotactic polypropylene resin. Substrates having larger nominal caliper are similarly produced for ribbons providing dense transfer of ink. Ratios by weight of approximately 9 parts polyethylene to 1 part polypropylene to approximately 8 parts polyethylene to 2 parts polypropylene have been found effective. More specifically, the propropylene is a random copolymer of 96 parts by weight polypropylene and 4 parts by weight polyethylene, the polyethylene moiety being to promote mixing and long term stability of the mixture.

Forming of the layer may be by standard extrusion on to a temperature-controlled roll, and the ink layer may be essentially a standard polyamide based blend with carbon black or other pigments.

The resulting ribbon has good printing and lift-off correction characteristics.

BEST MOST FOR CARRYING OUT THE INVENTION

Pellets of the following two resins are combined in a screw mixer where shearing action melts and thoroughly mixes the resins. The resins are as follows, in percent by weight:

| Resins Mixed From Pellets | % by Weight |
|---|---|
| Polyethylene (Dupont 6340-3) | 90 to 80 |
| 96:4 Isotactic Polypropylene-Polyethylene Copolymer (ENRON NPP-3303CO) | 10 to 20 |

The copolymer is a random copolymer of approximately 96 parts isotactic polypropylene and four parts polyethylene.

The thoroughly mixed, melted blend is extruded onto a rotating steel roller through a die gap of approximately 8 to 10 mil (approximately 0.0203 cm to 0.0254 cm) thickness. The extrusion temperature is 365° F. (approximately 185° C.) at the die and throughout the barrel of the extruder. The steel roller is at approximately 86° F. (approximately 30° C.) temperature and is rotating at a tangential velocity of approximately 500 feet per minute (approximately 150 meters pre minute). The effective width of the die is approximately 40 inches (approximately 102 cm), resulting in a somewhat narrower sheet because of necking at the edges and neck trim. The rotating rollers stretch the sheet until it is at the 0.23 mil caliper. Such processing is standard for chill roll extrusion for ribbons of greater thickness. The resulting sheet is then rolled in a bulk spool for subsequent coating with ink as may be convenient.

The ink formula is essentially standard. U.S. Pat. No. 3,825,470 to Elbert et al, assigned to the assignee to which this invention is assigned, teaches ink chemistry and formulas which generally would function suitably with this invention, assuming specific formulas are adjusted to the characteristics of the substrate and to the impact characteristics anticipated in printing. This invention is applicable with inks of various formulations, and therefore an illustrative ink formula is given here rather than the precise ingredients which would be used for a specific printer with specific impact characteristics. The following ink formula is in proportion for this 0.23 mil caliper preferred embodiment for printing by a daisywheel typewriter, which is a moderate impact printer. In the following formula, the isopropyl alcohol and the toluene function as a dispersing agent or solvent which is expelled when the formula is applied to the substrate, as is conventional. The other ingredients remain on the substrate as the ink layer. Ink thickness is 2 to 3 microns.

| Ink Formula (Wet) | % by Weight |
|---|---|
| Polyamide resin (Dilinoleic acid type, UNIREZ brand) | 9.6 |
| Oils: Mineral and Octyl esters of fatty acids (1.2 part mineral to 1 part esters by weight) | 9.0 |
| Carbon black | 6.4 |
| Isopropyl alcohol | 70.6 |
| Toluene | 4.4 |

| Ink Formula (Dry) | % by Weight |
|---|---|
| Polyamide | 38.4 |
| Oils | 36.0 |
| Carbon black | 25.6 |

The advantages of a substrate of this polymer blend may be seen from scanning electron microscopic views of the ink-substrate interface. A pore structure is formed by the precipitation of oils from the ink as pores on to the substrate during expulsion of the isopropyl alcohol and toluene solvent. Comparison of the microscopic examination of the 0.23 mil substrate caliper ribbon with and without the copolymer shows the pore configuration of pores of oil in contact with the substrate to be significantly larger on the substrate with the copolymer than on the substrate without the copolymer. Since oils are less adhesive to the substrate than the polyamide resin, the smaller pores in contact with the substrate result in greater adhesion of ink to the ribbon. This is generally undesirable as it tends to reduce ink release during printing. The no-copolymer-substrate ribbons also have a lower ink cohesion because the pores of the oil extend further into the ink layer. Thickness of the resin portion of the ink away from the substrate is reduced. Since the resin portion provides much more cohesive strength than the oils, the reduced thickness of resin away from the substrate reduces ink cohesiveness there. Such cohesiveness is generally desirable as it tends to pull more ink from the ribbon during printing and to be better pulled away during lift-off correction. Conversely, the pore structure of the 0.23 mil substrate ribbon of this invention closely approximates that of the commercial 0.4 mil polyethylene substrate ribbon having the same basic ink formula.

Where the substrate according to this invention is thicker, the ribbon prints proportionally denser, which is significant particularly for printing on rough papers.

What is claimed is:

1. A film printer ribbon having a substrate of thickness of less than 0.35 mil consisting essentially of a blend of polyethylene and a copolymer comprising isotactic polypropylene and polyethylene, said polyethylene in said copolymer being in an amount sufficient to promote mixing and long term stability of said blend while said copolymer remains essentially isotactic polypropylene, said substrate carrying an ink to be transferred by impact printing.

2. The printer ribbon as in claim 1 in which said ink comprises resin and oil.

3. A film printer ribbon comprising a substrate of thickness of less than 0.35 mil which is a blend of about 90% to 80% by weight polyethylene and about 10% to 20% by weight isotactic polypropylene and carrying an ink to be transferred by printing impact.

4. The printer ribbon as in claim 3 in which said ink comprises resin and oil.

5. A film printer ribbon comprising a substrate which is a blend of polyethylene in an amount by weight of about 90% to 80% of said substrate and a copolymer of isotactic polypropylene and polyethylene in the order of magnitude by weight of 96 parts isotactic polypropylene to 4 parts polyethylene and in an amount by weight of said substrate of about 10% to 20%, said substrate having a thickness of less than 0.35 mil and carrying an ink comprising resin and oil to be transferred by printing impact.

* * * * *